United States Patent
Demtchouk et al.

(10) Patent No.: US 9,070,387 B1
(45) Date of Patent: Jun. 30, 2015

(54) INTEGRATED HEAT-ASSISTED MAGNETIC RECORDING HEAD/LASER ASSEMBLY

(71) Applicant: Western Digital Technologies, Inc., Irvine, CA (US)

(72) Inventors: Alexander V. Demtchouk, Sunnyvale, CA (US); Yongping Gong, Pakkret (TH)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/051,397

(22) Filed: Oct. 10, 2013

Related U.S. Application Data

(60) Provisional application No. 61/869,155, filed on Aug. 23, 2013.

(51) Int. Cl.
| | | |
|---|---|---|
| *G11B 11/00* | (2006.01) | |
| *G11B 5/31* | (2006.01) | |
| *G11B 13/04* | (2006.01) | |

(52) U.S. Cl.
CPC ............... *G11B 5/314* (2013.01); *G11B 13/04* (2013.01)

(58) Field of Classification Search
None
See application file for complete search history.

(56) References Cited

U.S. PATENT DOCUMENTS

| | | |
|---|---|---|
| 3,663,184 A | 5/1972 | Wood et al. |
| 4,817,854 A | 4/1989 | Tihanyi et al. |
| 4,836,435 A | 6/1989 | Napp et al. |
| 5,197,654 A | 3/1993 | Katz et al. |
| 5,208,186 A | 5/1993 | Mathew |
| 5,559,817 A | 9/1996 | Derkits, Jr. et al. |
| 5,719,070 A | 2/1998 | Cook et al. |
| 5,990,560 A | 11/1999 | Coult et al. |
| 6,075,673 A | 6/2000 | Wilde et al. |
| 6,097,575 A | 8/2000 | Trang et al. |
| 6,125,014 A | 9/2000 | Riedlin, Jr. |
| 6,125,015 A | 9/2000 | Carlson et al. |
| 6,130,863 A | 10/2000 | Wang et al. |
| 6,137,656 A | 10/2000 | Levi et al. |
| 6,144,528 A | 11/2000 | Anaya-Dufresne et al. |
| 6,147,838 A | 11/2000 | Chang et al. |
| 6,151,196 A | 11/2000 | Carlson et al. |
| 6,178,064 B1 | 1/2001 | Chang et al. |

(Continued)

FOREIGN PATENT DOCUMENTS

JP 05-190973 A 7/1993

OTHER PUBLICATIONS

Schulte, et al., "Characterization of a Novel Fluxless Surface Preparation for Die Interconnect Bonding,"Electronic Components and Technology Conference (ECTC), 2012 IEEE 62nd, May 29, 2012-Jun. 1, 2012, pp. 26-30.

*Primary Examiner* — Paul Huber

(57) ABSTRACT

A structure includes a substrate, a metallization layer on the substrate, and a cap layer on the metallization layer, wherein the cap layer includes a cap platinum (Pt) layer on the metallization layer, and a cap gold (Au) layer deposited on the Pt cap layer. A method of bonding a laser diode submount assembly to a hard disk assembly slider includes disposing a first metallization layer on the slider, disposing a cap layer on the first metallization layer, wherein the cap layer includes a cap Pt layer on the first metallization layer, and a cap Au layer deposited on the cap Pt layer, disposing a second metallization layer on the laser diode submount assembly, and forming a solder bond between the cap layer on the slider and the second metallization layer on the laser diode submount assembly.

15 Claims, 3 Drawing Sheets

(56) References Cited

U.S. PATENT DOCUMENTS

| | | |
|---|---|---|
| 6,181,522 B1 | 1/2001 | Carlson |
| 6,181,673 B1 | 1/2001 | Wilde et al. |
| 6,229,672 B1 | 5/2001 | Lee et al. |
| 6,236,543 B1 | 5/2001 | Han et al. |
| 6,246,547 B1 | 6/2001 | Bozorgi et al. |
| 6,249,404 B1 | 6/2001 | Doundakov et al. |
| 6,250,541 B1 | 6/2001 | Shangguan et al. |
| 6,330,131 B1 | 12/2001 | Nepela et al. |
| 6,339,518 B1 | 1/2002 | Chang et al. |
| 6,349,017 B1 | 2/2002 | Schott |
| 6,373,660 B1 | 4/2002 | Lam et al. |
| 6,378,195 B1 | 4/2002 | Carlson |
| 6,391,770 B2 | 5/2002 | Kosaki et al. |
| 6,522,504 B1 | 2/2003 | Casey |
| 6,538,850 B1 | 3/2003 | Hadian et al. |
| 6,548,317 B2 | 4/2003 | Taniguchi et al. |
| 6,548,831 B1 | 4/2003 | Tokuhiro et al. |
| 6,583,019 B2 | 6/2003 | Vandermeulen et al. |
| 6,583,953 B1 | 6/2003 | Han et al. |
| 6,646,832 B2 | 11/2003 | Anaya-Dufresne et al. |
| 6,661,612 B1 | 12/2003 | Peng |
| 6,665,146 B2 | 12/2003 | Hawwa et al. |
| 6,690,545 B1 | 2/2004 | Chang et al. |
| 6,704,173 B1 | 3/2004 | Lam et al. |
| 6,708,389 B1 | 3/2004 | Carlson et al. |
| 6,717,773 B2 | 4/2004 | Hawwa et al. |
| 6,721,142 B1 | 4/2004 | Meyer et al. |
| 6,740,822 B2 | 5/2004 | Watanabe |
| 6,744,599 B1 | 6/2004 | Peng et al. |
| 6,762,123 B2 | 7/2004 | Curro et al. |
| 6,771,468 B1 | 8/2004 | Levi et al. |
| 6,796,018 B1 | 9/2004 | Thornton |
| 6,801,402 B1 | 10/2004 | Subrahmanyam et al. |
| 6,856,489 B2 | 2/2005 | Hawwa et al. |
| 6,873,496 B1 | 3/2005 | Sun et al. |
| 6,912,103 B1 | 6/2005 | Peng et al. |
| 6,930,389 B2 | 8/2005 | Huang |
| 6,937,439 B1 | 8/2005 | Chang et al. |
| 6,956,718 B1 | 10/2005 | Kulkarni et al. |
| 6,972,930 B1 | 12/2005 | Tang et al. |
| 7,006,330 B1 | 2/2006 | Subrahmanyam et al. |
| 7,006,331 B1 | 2/2006 | Subrahmanyam et al. |
| 7,010,847 B1 | 3/2006 | Hadian et al. |
| 7,015,583 B2 | 3/2006 | Ishii et al. |
| 7,019,945 B1 | 3/2006 | Peng et al. |
| 7,027,264 B1 | 4/2006 | Subrahmanyam et al. |
| 7,085,104 B1 | 8/2006 | Hadian et al. |
| 7,099,117 B1 | 8/2006 | Subrahmanyam et al. |
| 7,168,608 B2 | 1/2007 | Mei |
| 7,174,622 B2 | 2/2007 | Meyer et al. |
| 7,196,356 B2 | 3/2007 | Ishii et al. |
| 7,245,014 B2 | 7/2007 | Kurita et al. |
| 7,276,386 B2 | 10/2007 | Miyata et al. |
| 7,289,299 B1 | 10/2007 | Sun et al. |
| 7,298,049 B2 | 11/2007 | Amoh et al. |
| 7,307,816 B1 | 12/2007 | Thornton et al. |
| 7,315,435 B1 | 1/2008 | Pan |
| 7,315,436 B1 | 1/2008 | Sanchez |
| 7,368,666 B2 | 5/2008 | Takeda |
| 7,372,142 B2 | 5/2008 | Ferrara et al. |
| 7,414,814 B1 | 8/2008 | Pan |
| 7,436,631 B1 | 10/2008 | Fanslau, Jr. et al. |
| 7,462,861 B2 | 12/2008 | Slater, Jr. et al. |
| 7,463,454 B2 | 12/2008 | Mastromatteo et al. |
| 7,474,508 B1 | 1/2009 | Li et al. |
| 7,477,486 B1 | 1/2009 | Sun et al. |
| 7,593,190 B1 | 9/2009 | Thornton et al. |
| 7,595,963 B1 | 9/2009 | Chen et al. |
| 7,601,625 B2 | 10/2009 | Noritake et al. |
| 7,616,405 B2 | 11/2009 | Hu et al. |
| 7,729,089 B1 | 6/2010 | Hogan |
| 7,995,310 B1 | 8/2011 | Pan |
| 8,018,685 B2 | 9/2011 | Shimazawa et al. |
| 8,081,400 B1 | 12/2011 | Hu |
| 8,087,973 B1 | 1/2012 | Sladek et al. |
| 8,089,730 B1 | 1/2012 | Pan et al. |
| 8,164,858 B1 | 4/2012 | Moravec et al. |
| 8,199,437 B1 | 6/2012 | Sun et al. |
| 8,208,224 B1 | 6/2012 | Teo et al. |
| 8,218,268 B1 | 7/2012 | Pan |
| 8,240,545 B1 | 8/2012 | Wang et al. |
| 8,254,212 B2 | 8/2012 | Snyder et al. |
| 8,256,272 B1 | 9/2012 | Roajanasiri et al. |
| 8,295,012 B1 | 10/2012 | Tian et al. |
| 8,295,013 B1 | 10/2012 | Pan et al. |
| 8,295,014 B1 | 10/2012 | Teo et al. |
| 8,320,084 B1 | 11/2012 | Shum et al. |
| 8,325,446 B1 | 12/2012 | Liu et al. |
| 8,325,447 B1 | 12/2012 | Pan |
| 8,339,742 B1 | 12/2012 | Sladek et al. |
| 8,339,747 B1 | 12/2012 | Hales et al. |
| 8,339,748 B2 | 12/2012 | Shum et al. |
| 8,343,363 B1 | 1/2013 | Pakpum et al. |
| 8,345,519 B1 | 1/2013 | Pan |
| 8,418,353 B1 | 4/2013 | Moravec et al. |
| 8,441,896 B2 | 5/2013 | Wang et al. |
| 8,446,694 B1 | 5/2013 | Tian et al. |
| 8,456,643 B2 | 6/2013 | Prabhakaran et al. |
| 8,456,776 B1 | 6/2013 | Pan |
| 8,462,462 B1 | 6/2013 | Moravec et al. |
| 8,477,459 B1 | 7/2013 | Pan |
| 8,485,579 B2 | 7/2013 | Roajanasiri et al. |
| 8,488,279 B1 | 7/2013 | Pan et al. |
| 8,488,281 B1 | 7/2013 | Pan |
| 8,490,211 B1 | 7/2013 | Leary |
| 8,514,522 B1 | 8/2013 | Pan et al. |
| 8,533,936 B1 | 9/2013 | Puttichaem et al. |
| 8,545,164 B2 | 10/2013 | Choumwong et al. |
| 8,553,365 B1 | 10/2013 | Shapiro et al. |
| 8,587,901 B1 | 11/2013 | Puttichaem et al. |
| 8,593,764 B1 | 11/2013 | Tian et al. |
| 8,599,653 B1 | 12/2013 | Mallary et al. |
| 8,605,389 B1 | 12/2013 | Pan et al. |
| 8,611,050 B1 | 12/2013 | Moravec et al. |
| 8,611,052 B1 | 12/2013 | Pan et al. |
| 8,623,197 B1 | 1/2014 | Kobsiriphat et al. |
| 8,624,184 B1 | 1/2014 | Souza et al. |
| 8,665,566 B1 | 3/2014 | Pan et al. |
| 8,665,567 B2 | 3/2014 | Shum et al. |
| 8,665,677 B1 | 3/2014 | Panitchakan et al. |
| 8,665,690 B1 | 3/2014 | Moravec et al. |
| 8,693,144 B1 | 4/2014 | Pan et al. |
| 8,756,795 B1 | 6/2014 | Moravec et al. |
| 8,758,083 B1 | 6/2014 | Rudy et al. |
| 8,760,812 B1 | 6/2014 | Chen et al. |
| 8,770,463 B1 | 7/2014 | Puttichaem et al. |
| 8,773,664 B1 | 7/2014 | Wang et al. |
| 8,792,212 B1 | 7/2014 | Pan et al. |
| 8,792,213 B1 | 7/2014 | Vijay et al. |
| 8,797,691 B1 | 8/2014 | Tian et al. |
| 2004/0029304 A1 | 2/2004 | Naydenkov et al. |
| 2005/0227413 A1 | 10/2005 | John et al. |
| 2007/0228105 A1 | 10/2007 | Oshika et al. |
| 2007/0273025 A1 | 11/2007 | Bellaiche |
| 2009/0091024 A1 | 4/2009 | Zeng et al. |
| 2010/0244239 A1 | 9/2010 | Bao et al. |
| 2011/0205860 A1 | 8/2011 | Chou et al. |
| 2012/0163138 A1 | 6/2012 | Gage et al. |
| 2013/0016591 A1 | 1/2013 | Tomikawa et al. |
| 2013/0244541 A1 | 9/2013 | Yaemglin et al. |
| 2013/0293982 A1 | 11/2013 | Huber |

INTEGRATED HEAT-ASSISTED MAGNETIC RECORDING HEAD/LASER ASSEMBLY

CROSS REFERENCE TO RELATED APPLICATIONS

This application claims priority to provisional U.S. Patent Application Ser. No. 61/869,155, filed on Aug. 23, 2013, which is hereby incorporated by reference in its entirety.

BACKGROUND

Hard disk drives are used to store and retrieve digital information for computers and other devices. A typical hard disk drive includes a high speed rotating disk having a magnetic material on its surface. Digital information is written to and read from the disk as it rotates past a magnetic head over an air bearing interface. The magnetic head is used to detect and modify the magnetic bits on the disk's surface immediately below it. An actuator arm moves the magnetic head on an arc across the rotating disk, thereby allowing the magnetic head to access the entire disk.

In older hard disk drive designs, the bits were oriented circumferentially along the track and parallel to the disk. Today, in most hard disk drives, the bits are orientated perpendicular to the disk. These systems, known as PMR systems, reduce the size of the segment required to represent one bit of information through the perpendicular orientation of the magnetization, thereby increasing the areal density.

The magnetic head for a PMR system is designed to generate a perpendicular magnetic field. This may be achieved by embedding a soft magnetic under-layer into the disk, below the magnetic surface. In this configuration, the magnetic flux, which results from the magnetic field produced by the magnetic head, is passed through the soft magnetic under-layer and returned to the magnetic head to complete the magnetic circuit. The result is a magnetic charge with a magnetic orientation perpendicular to the surface of the disk.

The limitation of PMR is often characterized by the competing requirements of readability, writeability and stability. A problem is that to store data reliably for very small bit sizes the magnetic medium must be made of a material with a very high coercivity. At some capacity point, the bit size is so small and the coercivity correspondingly so high that the magnetic field used for writing data cannot be made strong enough to permanently affect the data and data can no longer be written to the disk.

Heat-assisted magnetic recording (HAMR) is a technology that magnetically records data on high thermal stability media using thermal assistance to first heat the material. HAMR solves this problem by temporarily and locally changing the coercivity of the magnetic storage medium by raising the temperature above the Curie temperature. Above this temperature, the medium effectively loses coercivity and a realistically achievable magnetic write field can write data to the medium. HAMR takes advantage of high-stability magnetic compounds such as iron platinum alloy. These materials can store single bits in a much smaller area without being limited by the same super paramagnetic effect that limits older technology used in hard disk storage, where the writing condition requires that the disk media must be locally heated to apply the changes in magnetic orientation at reduced coercivity.

One type of heat-assisted magnetic recording (HAMR) requires integration of a laser diode (LD) with the recording head. The laser provides light into a waveguide (WG) to energize a Near-Field Transducer (NFT) at the air bearing surface (ABS) and write pole. Metal solder bonding provides good thermal conductivities between the laser, submount and slider assemblies (to maintain stable temperature LD operation) and electric conductivities (if required) and high mechanical bond strength.

Native oxides, however, quickly form on many of the common bond materials, which can compromise the effectiveness of the bonding process and the integrity of the joint and long-term reliability. Because oxides adhere poorly to other metals, the bonding processes must break through surface oxides to establish metal-to-metal cohesion. Even after bonding, the oxides may provide a convenient site for further oxidation, leading to joint reliability and performance problems.

To assure satisfactory bonding between the submount and the slider assemblies, various procedures to block or limit the formation of native oxides may be used. Capping the solder with a gold (Au) layer has been used for preventing extreme solder oxidation. However, it is known, that tin (Sn) solder is very reactive with Au, capable of forming different $AuSn_x$, intermetallic compounds (IMCs) (with x=4, 2, 1) at lower temperatures (even down to ambient temperature and during film deposition) and capping Sn solder with Au alone may not provide complete solder surface coverage. Exposed Sn may oxidize (which is a danger to corrosion in post-processing) and may affect the integrity of the soldering process, resulting in brittle solder bonds and voids. At the same time, excessive amounts of Au in the capping layer could results in formation of a higher Au content IMC such as $Sn_2Au$ and SnAu which consequently have a higher melting temperature (e.g., >200C) and could impact the final solder re-melting temperature.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
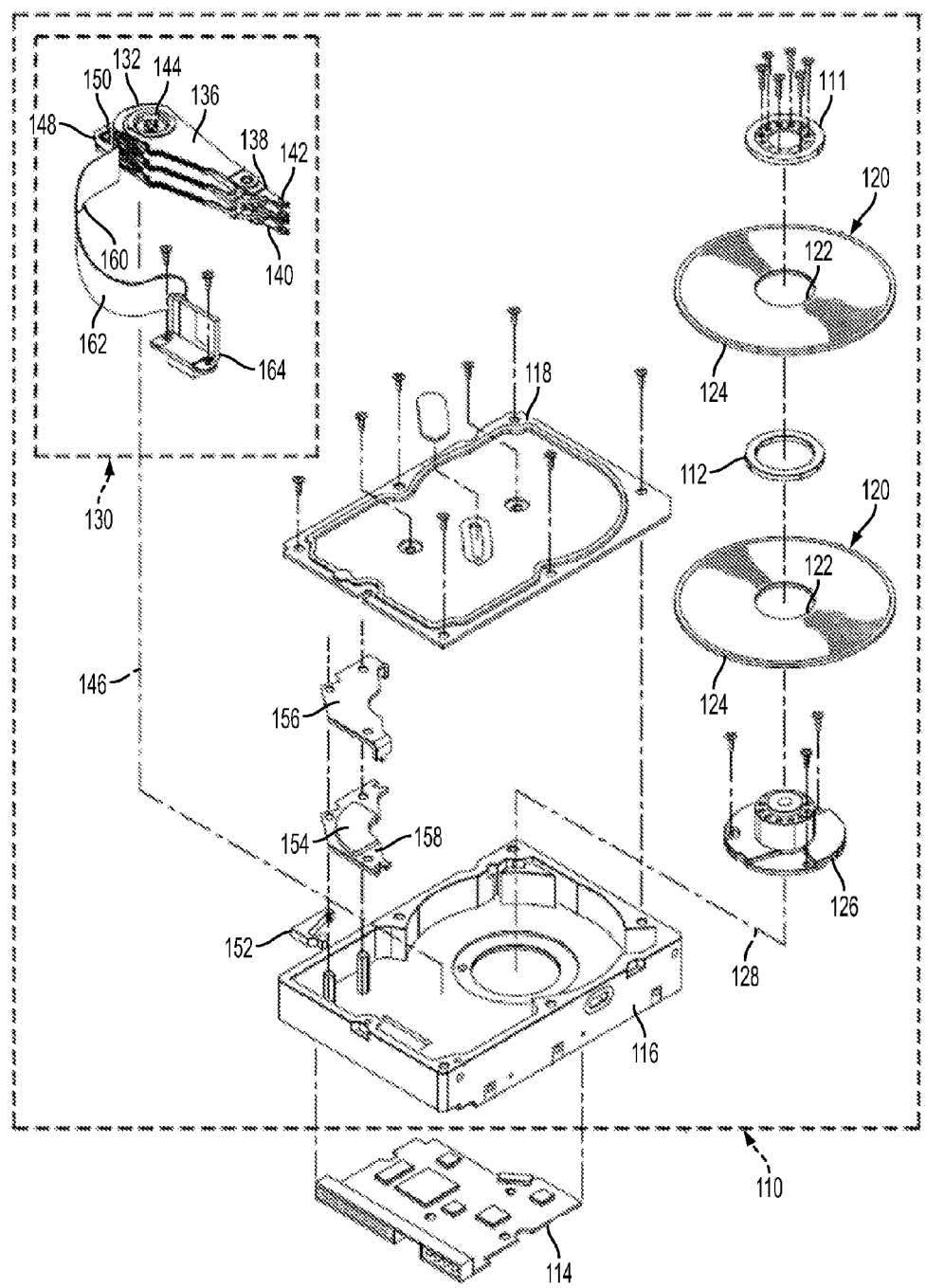
FIG. 1 is an exploded perspective view of a disk drive according to an example embodiment of the present invention.

The detailed description is intended to provide a description of various exemplary embodiments of the present invention and is not intended to represent the only embodiments in which the invention may be practiced. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus or method does not require that all embodiments of the invention include the described components, structure, features, functionality, processes, advantages, benefits, or modes of operation.

Various aspects of the present invention will be described herein with reference to drawings that are schematic illustrations of idealized configurations of the present invention. As such, variations from the shapes of the illustrations as a result, for example, manufacturing techniques and/or tolerances, are to be expected. Thus, the various aspects of the present invention presented throughout this disclosure should not be construed as limited to the particular shapes of elements (e.g., regions, layers, sections, substrates, etc.) illustrated and described herein but are to include deviations in shapes that result, for example, from manufacturing. By way of example, an element illustrated or described as a rectangle may have rounded or curved features and/or a gradient concentration at its edges rather than a discrete change from one element to another. Thus, the elements illustrated in the drawings are schematic in nature and their shapes are not intended to illustrate the precise shape of an element and are not intended to limit the scope of the present invention.

It will be understood that when an element such as a region, layer, section, substrate, or the like, is referred to as being "on" another element, it can be directly on the other element or intervening elements may also be present. In contrast, when an element is referred to as being "directly on" another element, there are no intervening elements present. It will be further understood that when an element is referred to as being "formed" on another element, it can be grown, deposited, etched, attached, connected, coupled, or otherwise prepared or fabricated on the other element or an intervening element.

The terms "connected," "coupled," or any variant thereof, mean any connection or coupling, either direct or indirect, between two or more elements, and can encompass the presence of one or more intermediate elements between two elements that are "connected" or "coupled" together. The coupling or connection between the elements can be physical, logical, or a combination thereof. As used herein, two elements can be considered to be "connected" or "coupled" together by the use of one or more wires, cables, printed electrical connections, or any other suitable means.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element.

In exemplary embodiments described in this application, aspects of a thin film structure are disclosed. The thin film includes a substrate, a metallization layer on the substrate, and a cap layer on the metallization layer, wherein the cap layer includes a platinum (Pt) cap layer on the metallization layer, and an Au cap layer deposited on the Pt cap layer.

Furthermore, aspects of a thin film solder are disclosed. The thin film includes a Sn layer, a Pt layer on the Sn layer, and an Au layer on the Pt layer.

Additionally, aspects of a method of forming a thin film solder are disclosed. The method includes disposing a Pt layer on a Sn layer and disposing a Au layer the Pt layer.

Additionally, aspects of a method of bonding a laser diode submount assembly to slider for a hard disk drive are disclosed. The method includes disposing a first metallization layer on the slider, disposing a cap layer on the first metallization layer, wherein the cap layer includes a cap Pt layer on the first metallization layer, and a cap Au layer deposited on the cap Pt layer, disposing a second metallization layer on the laser diode submount assembly, and forming a solder bond between the cap layer on the slider and the second metallization layer on the laser diode submount assembly.

Additionally, aspects of a hard disk drive are disclosed. The hard disk drive includes magnetic disk, a head assembly comprising a slider, a first metallization layer on the slider, a laser diode submount assembly arranged with the slider, a cap layer on the first metallization layer, wherein the cap layer includes a cap Pt layer on the first metallization layer, a cap Au layer deposited on the cap Pt layer, and a second metallization layer on the laser diode submount assembly, wherein the cap layer on the slider is soldered to the second metallization layer on the laser diode submount assembly.

It will be understood that other aspects of the present invention will become readily apparent to those skilled in the art from the following detailed description, wherein it is shown and described only several embodiments of the invention by way of illustration. As will be realized by those skilled in the art, the present invention is capable of other and different embodiments and its several details are capable of modification in various other respects, all without departing from the spirit and scope of the invention. Accordingly, the drawings and detailed description are to be regarded as illustrative in nature and not as restrictive.

FIG. 1 is an exploded perspective view of an exemplary hard disk drive. The disk drive includes a head disk assembly (HDA) 101 and a printed circuit board assembly (PCBA) 14. The HDA 101 includes a base 116 and cover 118 that together house at least one annular magnetic disk 120. Each disk 120 contains a plurality of magnetic tracks for storing data. The tracks are disposed upon opposing first and second disk surfaces of the disk 120 that extend between an inner disk edge 122 (corresponding to the inner diameter) and an outer disk edge 124 (corresponding to the outer diameter) of the disk 120. The head disk assembly 110 further includes a spindle motor 126 for rotating the disk 120 about a disk axis of rotation 128. The spindle motor 126 includes a spindle motor hub that is rotatably attached to the base 116 of the HDA 110. Disks 120 may be stacked and separated with one or more annular disk spacers 112 that are disposed about the hub, all held fixed to the hub by disk clamp 111.

The HDA 101 further includes a head stack assembly (HSA) 30 rotatably attached to the base 116 of HDA 101. The HSA 130 includes an actuator comprising an actuator body 132 and one or more actuator arms 36 extending from the actuator body 132. The actuator body 132 includes a bore 144 and a pivot bearing cartridge engaged within the bore for facilitating the HSA 130 to rotate relative to HDA 101 about actuator pivot axis 146. One or two head gimbal assemblies (HGA) 138 are attached to a distal end of each actuator arm 136. Each HGA includes a head (e.g. head 140) for reading and writing data from and to the disk 120, and a load beam 142 to compliantly preload the head against the disk 120. The HSA 130 further includes a coil support 148 that extends from one side of the HSA 130 that is opposite head 140. The coil support 148 is configured to support a coil 150 through which a changing electrical current is passed. The coil 150 interacts with one or more magnets 154 that are attached to base 116 via a yoke structure 156, 158 to form a voice coil motor for controllably rotating the HSA 130. HDA 101 includes a latch 152 rotatably mounted on base 116 to prevent undesired rotations of HSA 130.

The PCBA 114 includes a servo control system for generating servo control signals to control the current through the coil 150 and thereby position the HSA 130 relative to tracks disposed upon surfaces of disk 120. The PCBA 114 also includes channel electronics to receive and provide electrical signals to the heads 140 of the HGAs 138 of the HSA 130, e.g. for reading and writing data to the disks 10. The HSA 130 is electrically connected to PCBA 114 via a flexible printed circuit (FPC) 160, which includes a flex cable 162 and a flex cable support bracket 164. The flex cable 162 supplies current to the coil 150 and carries signals between the HSA 130 and the PCBA 114.

In the magnetic hard disk drive 100 of FIG. 1, the head 140 is included in a slider (described in FIG. 2) that carries a magnetic transducer on its trailing end (not visible given the scale of FIG. 1). The magnetic transducer may include an inductive write element and a magnetoresistive read element. During operation the transducer is separated from the magnetic disk by a very thin hydrodynamic air bearing. As the motor 126 rotates the magnetic disk 120, the hydrodynamic air bearing is formed between an air bearing surface of the slider of head 140, and a surface of the magnetic disk 120. The thickness of the air bearing at the location of the transducer is commonly referred to as "flying height."

Figure 2:
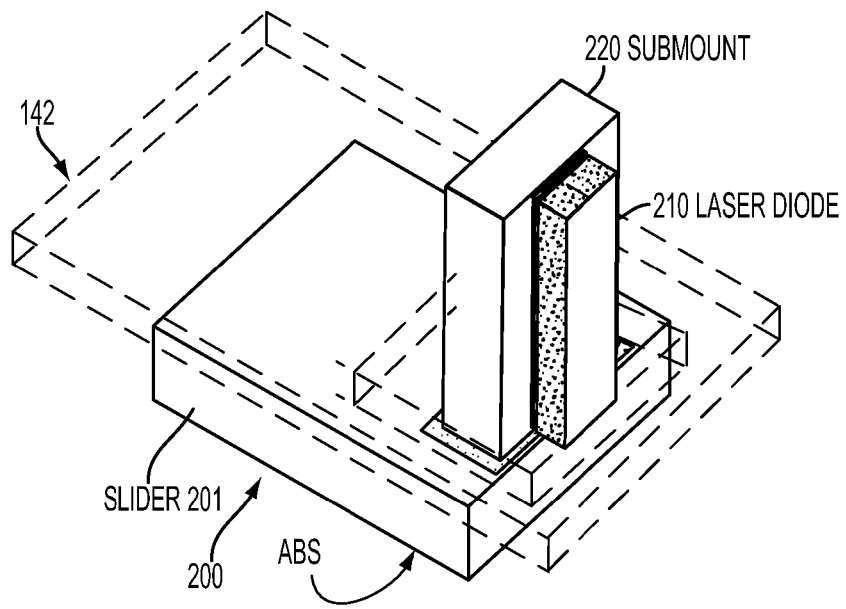
FIG. 2 is a perspective view of laser diode/submount assembly attached to a slider in accordance with the disclosure.

Referring to FIG. 2, the load beam 142 (shown in dotted lines) supports a slider 201 (where the air bearing surface ABS is indicated on the bottom surface, not visible in this view). The slider 201 may be further enhanced to include a laser diode LD 210 on a submount SM 220 to enable HAMR, which together may be referred to as an integrated HAMR head/laser assembly 200. The integrated HAMR head/laser assembly 200 includes two solder bonded interfaces a first to solder bond the LD 210 to the SM 220 with eutectic Au80Sn20 solder having a relatively high melting temperature (~300 C) and a second solder bond of the LD/SM assembly 220 to the slider with a lower melting temperature (~200 C) Sn-rich/Au solder.

To prevent the Sn-rich/Au solder from oxidation and corrosion, a Pt/Au cap may be used. The thin Pt layer in the thin film solder works as barrier to prevent Au alloying with Sn during deposition and to better protect the surface of the Sn layer from environmental contamination, besides oxidation, including chemistry from photolithographic process.

Figure 3A:
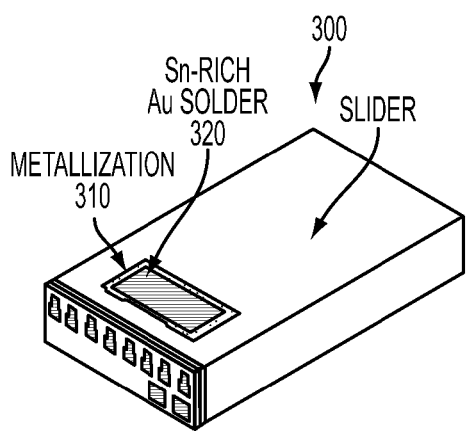
FIG. 3A is a perspective view of the solder and metallization area on the slider in accordance with the disclosure.
Figure 3B:
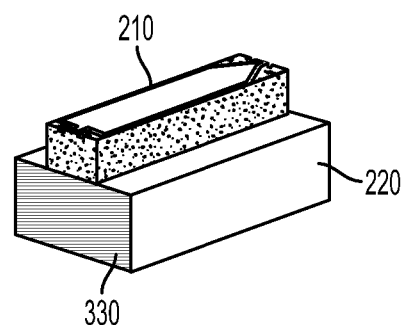
FIG. 3B is a perspective view of a laser diode/submount assembly in accordance with the disclosure.

Accordingly, referring to FIG. 3A, a structure is disclosed having metallization and solder stack pad deposited on a slider 300 in two steps that may be effected by E-beam evaporations and photolithographic resist lift-off process. The metallization layer 310 on the slider 300 includes a Ti adhesion layer, a Pt low diffusive material barrier and an Au wetting layer. The solder layer includes Sn and a cap layer to prevent Sn solder from oxidation/corrosion. The LD/SM assembly 210/220 includes another bonding pad 330 on an end of the submount 220 that is soldered to the slider 300, which may contain a metallization pad only for bonding the LD/SM assembly 210/220 to the slider 300, as shown in FIG. 3B, and as shown assembled in the completed configuration in FIG. 2. During the soldering process, when these two parts are aligned, brought into contact and heated, the solder melts, and Au (e.g., from Under Bump Metallization (UBM), or Under Solder Metallization (USM)) dissolves into the Au/Sn solder of the adjacent part. The composition of the metallizations and solder selected for this soldering process is chosen to have a lower melting point than that of the solder that joins the LD 210 to the submount 220, insuring that the LD 210 will not detach from the submount 220 during this step. Intermetallic compounds (IMCs) formed between Sn and Au may cause the solder to freeze by depletion of Sn or enriching the Au concentration, which causes the melting point to rise. At least two routes are available in the solder process, which may be used in combination. After the parts are aligned and brought in contact at ambient temperature, the parts may be heated. The rise in temperature results in melting of the solder. At this point, one or both of two processes may occur. The temperature may then be ramped down to cool and solidify the solder joint. Concurrently, as interdiffusion of Au and Sn proceeds, the melting point of the changing eutectic may rise, causing the solder to freeze, i.e., solidify. A combination of controlling the rate of cooling and the rate of interdiffusion may be used to achieve the solder bond. If Sn-rich solder becomes oxidized or corroded during environmental exposure it will may become very difficult to achieve a reliable ultimate contact and precision alignment of the bonded parts. It may then require increasing bonding force to break surface oxides layer which may compromise these parts, including precision alignment. Also surface oxidation/corrosion may result in voids forming in the solder joint, resulting in lower bond strength, adversely affecting solder joint reliability.

Figure 4:
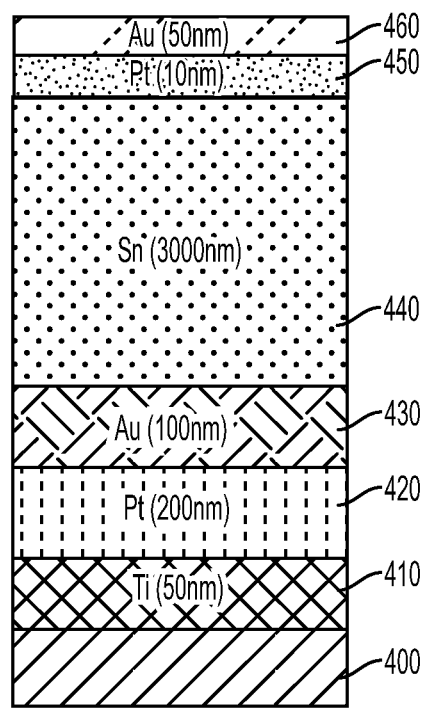
FIG. 4 illustrates a thin film Au and platinum (Pt) barrier layer of a solder and metallization stack in accordance with the disclosure.

FIG. 4 illustrates an exemplary structure having a Sn solder stack that may be include a thin Pt/Au cap. The stack in FIG. 4, disposed on a substrate 400, may include a Ti layer 410, a Pt layer 420, a Au layer 430, referred to as the metallization layer, a Sn solder layer 440, and a cap layer comprised of a Pt cap layer 450 and a Au cap layer 460, referred to as the Sn-rich Au solder of FIG. 3A on the slider 300. The Pt cap layer 450 (~5-15 nm) serves as a penetration barrier between the Au cap layer 460 and the Sn solder layer 440.

The formation of IMCs when the Pt cap layer 450 is not used in the Pt/Au cap may leave significant portions of the surface to consist of exposed Sn due to intermetallic migration of Au and Sn, which is prone to oxidation. This may result in lower shear flow bond strength of the HAMR integrated slider assembly (ISA) 200, indicating a loss of bonding integrity, which may adversely affect bond strength, thermal and electrical conductivity through formation of solder voids. Additionally, with a thin layer of the Au cap layer 460 (e.g., ~25-100 nm) the shift in the eutectic melting point to a higher temperature may be limited.

Various aspects of forming a structure with a low melting temperature solder for improve surface resistance to oxidation have been described in the context of a LD for hard disk drive slider. However, as those skilled in the art will readily appreciate, such aspects of a structure are not limited to sliders, or other components within a hard disk drive. Accordingly any reference to a specific apparatus or method is intended only to illustrate exemplary applications of such structures with the understanding that various aspects of these structures may have a wide range of applications.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

The invention claimed is:

1. A method of bonding a laser diode submount assembly to a slider for a hard disk drive comprising:
    disposing a first metallization layer on the slider;
    disposing a cap layer on the first metallization layer, wherein the cap layer comprises:
        a cap platinum (Pt) layer on the first metallization layer; and
        a cap gold (Au) layer deposited on the cap Pt layer;
    disposing a second metallization layer on the laser diode submount assembly; and
    forming a solder bond between the cap layer on the slider and the second metallization layer on the laser diode submount assembly.

2. The method of claim 1, wherein disposing the first metallization layer comprises
    disposing a first titanium (Ti) layer on the slider;
    disposing a first Pt layer on the first Ti layer;
    disposing a first Au layer on the first Pt layer; and
    disposing a first Sn layer on the first Au layer.

3. The method of claim 2, wherein the first metallization layer, first Pt layer and first Au layer are patterned.

4. The method of claim 3, wherein disposing the second metallization layer on the laser diode submount assembly comprises
    disposing a second Ti layer on the laser diode submount assembly;
    disposing a second Pt layer on the second Ti layer; and
    disposing a second Au layer on the second Pt layer.

5. The method of claim 4, wherein the cap layer and the second metallization layer are patterned.

6. The method of claim 5, wherein forming the solder bond comprises
    aligning the Au layer pattern on the slider with the second Au layer of the patterned second metallization layer on the laser diode submount assembly;
    contacting the aligned Au layer and second Au layer;
    raising the temperature of the slider and laser diode submount assembly;
    causing all Au and Sn layers to form a molten solder; and
    lowering the temperature of the slider and laser diode submount assembly, thereby causing the solder to freeze.

7. The method of claim 1, wherein the cap Pt layer is substantially between 5 and 15 nm thick.

8. The method of claim 1, wherein the cap Au layer is substantially between 25 and 100 nm thick.

9. A hard disk drive comprising:
    a magnetic disk;
    a head assembly comprising a slider;
    a first metallization layer on the slider;
    a laser diode submount assembly arranged with the slider;
    a cap layer on the first metallization layer, wherein the cap layer comprises
        a cap platinum (Pt) layer on the first metallization layer;
        a cap gold (Au) layer deposited on the cap Pt layer; and
    a second metallization layer on the laser diode submount assembly, wherein the cap layer on the slider is soldered to the second metallization layer on the laser diode submount assembly.

10. The hard disk drive of claim 9, wherein the first metallization layer comprises
    a titanium (Ti) layer on the slider;
    a Pt layer on the Ti layer;
    a Au layer on the Pt layer; and
    a tin (Sn) layer on the Au layer.

11. The hard disk drive of claim 9, wherein the first metallization layer, cap Pt layer and cap Au layer are patterned.

12. The hard disk drive of claim 11, wherein the second metallization on the laser diode submount assembly comprises:
    a second Ti layer on the laser diode submount assembly;
    a second Pt layer on the second Ti layer; and
    a second Au layer on the second Pt layer.

13. The hard disk drive of claim 12, wherein the cap layer on the slider is soldered to the second metallization layer on the laser diode submount assembly through a solder bond and wherein the solder bond comprises:
    a bond formed between the patterned cap Au layer aligned to the second Au layer, wherein a temperature of the slider and laser diode submount assembly is raised to cause all Au and Sn layers to form a molten solder, followed by lowering the temperature to freeze the solder.

14. The hard disk drive of claim 9, wherein the cap Pt layer is substantially between 5 and 15 nm thick.

15. The hard disk drive of claim 9, wherein the cap Au layer is substantially between 25 and 100 nm thick.

\* \* \* \* \*